United States Patent
Aldossari

(10) Patent No.: US 11,546,070 B1
(45) Date of Patent: Jan. 3, 2023

(54) METHOD OF SELECTING AN OPTIMAL PROPAGATED BASE SIGNAL USING ARTIFICIAL NEURAL NETWORKS

(71) Applicant: University of South Florida, Tampa, FL (US)

(72) Inventor: Saud Mobark Aldossari, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/302,378

(22) Filed: Apr. 30, 2021

Related U.S. Application Data

(60) Provisional application No. 63/018,906, filed on May 1, 2020.

(51) Int. Cl.
*H04B 17/391* (2015.01)
*H04B 17/382* (2015.01)
(Continued)

(52) U.S. Cl.
CPC ..... *H04B 17/3913* (2015.01); *G06K 9/00536* (2013.01); *H04B 17/382* (2015.01); *H04W 40/18* (2013.01)

(58) Field of Classification Search
CPC .............. H04B 17/3913; H04B 17/382; G06K 9/00536; H04W 40/18
See application file for complete search history.

(56) References Cited

U.S. PATENT DOCUMENTS 10,217,346 B1 * 2/2019 Zhang ................... G06N 3/084
10,271,233 B2   4/2019 Kleinbeck et al.
(Continued)

FOREIGN PATENT DOCUMENTS

KR    20190102147 A    9/2019
WO    2019211792 A1   11/2019

OTHER PUBLICATIONS

Attiah et al., Adaptive multi-state millimeter wave cell selection scheme for 5G communications. International Journal of Electrical and Computer Engineering (IJECE). 2018. vol. 8 (No. 5): 2967-2978.

(Continued)

*Primary Examiner* — Duc C Ho
(74) *Attorney, Agent, or Firm* — Molly L. Sauter; Paul Murty; Smith & Hopen, P.A.

(57) ABSTRACT

A system and method of propagating signal links by using artificial neural networks using a relay link selection protocol to predict an optimal link or path, providing a reliable mechanism to meet 5G-new radio requirements. The artificial neural networks used in the method classify training and testing datasets into sufficient signal strengths and insufficient signal strengths, such that paths are evaluated for predicted propagation links, and such that the strongest propagation link can be selected. Specifically, a multilayer perceptron method is used to identify and characterize new link candidates using the path loss parameter or the received signal strength, such that optimal links can be selected and updated. To determine the sufficiency of a signal, a threshold energy strength is determined (for example, a threshold of −120 dBm can be used; any energy strength below the threshold is considered a poor propagation and is classified as an insufficient signal).

20 Claims, 5 Drawing Sheets

(51) Int. Cl.
*H04W 40/18* (2009.01)
*G06K 9/00* (2022.01)

(56) References Cited

U.S. PATENT DOCUMENTS

| | | | |
|---|---|---|---|
| 10,904,162 B2* | 1/2021 | Chung | H04L 45/302 |
| 2008/0013459 A1* | 1/2008 | Do | H04W 40/12 370/248 |
| 2021/0072029 A1* | 3/2021 | Marques | G06N 20/00 |

OTHER PUBLICATIONS

Miao et al. Deep learning for intelligent wireless networks: A comprehensive survey. IEEE Journal of Latex Class Files. 2018. vol. 14 (No. 8): 1-28.

Aldossari et al., Machine learning for wireless communication channel modeling: An overview. Wireless Personal Communications. 2019. vol. 106: 41-70.

He et al., Deep learning-based channel estimation for beamspace mmWave massive MIMO system. IEEE Wireless Communications Letters. 2018. vol. 7 (No. 5): 852-855.

Jiang et al. Inferring remote channel state information: Cramér-Rao lower bound and deep learning implementation IEEE Globecom. 2018: 1-7.

O'Shea et al., Deep learning based MIMO communications. 2017. arXiv preprint arXiv:1707.07980.

Nawaz et al. Quantum Machine Learning for 6G Communication Networks: State-of-the-Art and Vision for the Future. IEEE Access. 2019. vol. 7:46317-46350.

Translation of KR 20190102147 with a publication date of Sep. 3, 2019.

* cited by examiner

METHOD OF SELECTING AN OPTIMAL PROPAGATED BASE SIGNAL USING ARTIFICIAL NEURAL NETWORKS

CROSS-REFERENCE TO RELATED APPLICATIONS

This nonprovisional application is a continuation of and claims priority to provisional application No. 63/018,906, entitled "Method of selecting an optimal propagated base signal using artificial neural networks," filed on May 1, 2020, by the same inventor. This work was sponsored with funding from Prince Sattam bin Abdulaziz University, Saudi Arabia.

BACKGROUND OF THE INVENTION

1. Field of the Invention

This invention relates, generally, to methods of selecting a relay for optimal wireless signal transmission with reduced fading. More specifically, it relates to the use of artificial neural networks and other machine learning techniques to predict signal paths, classify the predicted signal paths, and select optimal signals to reduce signal loss and fading.

2. Brief Description of the Prior Art

Relay selection to optimize communication via wireless signals has become a critical technology, particularly with 5G new radio (5G-NR) and future mobile communication protocols. [1]. For example, relay selection in multi-hop communications has previously been shown to be successful for mobile communication over mmWave frequency bands between approximately 30 GHz and 300 GHz that can be used in 5G-NR implementations. [2], [3]. While mmWave frequencies provide fast communications when connected, the small bands suffer from signal path obstacles, such that the waves are traditionally limited to use over short distances. As such, the use of mmWave frequencies can be challenging, and often requires the use of intermediary signal relays. However, the selection of the optimal relay and optimal signal path determines the success of the signal consistency, requiring detailed analyses of the potential signal paths before selecting a path. Previous works have proposed adaptive multi-state selections utilizing different mmWave frequencies. [4].

As shown in FIG. 1, different devices may be used in different signal pathways from base station 10 to destination device 16, depending on environmental conditions along the path between base station 10 and destination device 16. For example, base station 10 and destination device 16 can directly transmit signals therebetween if line-of-site (LOS) is accomplished between station 10 and device 16 (labeled as line-of-site path 20 in FIG. 1). However, if LOS cannot be accomplished, a second transmitted signal including a handover to relay station 12 may be used, with the signal from base station 10 to relay station 12 labeled as relay path 40a, and the signal from relay station 12 to destination device 16 labeled as relay path 40b. Moreover, in the event of an obstacle between base station 10 and destination device 16, such as obstacle 14, base station 10 may transmit a first signal to obstacle 14 (labeled as obstructed path 30a in FIG. 1), with a second signal transmitted on an opposing side of obstacle 14 from obstacle 14 to destination device (labeled as obstructed path 30b in FIG. 1).

As the current state of the art signal type, 5G attempts to prioritize signal selection based on three pillars: enhanced mobile broadband (eMBB); ultra-reliable, low latency communications (URLLC); and massive machine type communications (mMTC). Reliability is key in successful 5G communications; as such, 5G-NR requires the propagation signal strength to attain 99.999% reliability. [5]. To accomplish the goals of 5G-NR technologies, previous works have suggested using deep learning to identify and classify modulation nodes, thereby improving interference alignment and locating an optimal routing path. [6]. Moreover, machine learning techniques, including deep neural networks (DNN), can reduce complexities and improve performance relating to signal path selection. [7]. However, previous works suffer from high rates of false positives and low rates of true positives, necessitating the use of improved machine learning techniques to provide successful signal strength predictions.

Accordingly, what is needed is an artificial neural network (ANN), such as a multilayer perceptron (MLP) model, used to classify signal paths for relay selection, with results that improve upon prior art techniques. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a method of selecting an optimal propagated base signal using artificial neural networks is now met by a new, useful, and nonobvious invention.

The novel method includes a step of building a network located on a server, with the network including a plurality of multilayer perceptrons. In an embodiment, the server is disposed proximate to a base station. Each multilayer perceptron includes a plurality of layers, and each of the plurality of layers includes a plurality of nodes, with each of the plurality of nodes in a single layer being connected to each of the plurality of nodes in a remainder of the plurality of layers. A plurality of propagation signals transmitted by a base station and received by a destination device are analyzed via the network to predict an optimal signal path.

As such, the network models each of the plurality of propagation signals, with each of the plurality of propagation signals having a different associated signal path. In an embodiment, each of the plurality of propagation signals transmitted by the base station resides within frequency ranges associated with 5G new radio standards.

The network analyzes each of the plurality of propagation signals to measure a sufficiency of each propagation signal based on a threshold energy strength. Specifically, the network measures a path loss for each of the plurality of propagation signals. The path loss is based on a frequency of each of the plurality of propagation signals and a distance traveled by each of the plurality of propagation signals. The network classifies each of the plurality of propagation signals based on a binary classification of a strong signal value and a weak signal value, such that the strong signal value includes an associated value greater than the threshold energy strength, and such that the weak signal value includes an associated value less than the threshold energy strength. The network selects the optimal signal path from the plurality of propagation signals, such that the optimal signal path is associated with the strong signal value. The base station propagates a signal to follow the optimal signal path from the base station to the destination device, such that the destination device receives the signal from the base station.

In an embodiment, each of the plurality of layers of the multilayer perceptrons includes a plurality of hidden layers between an input layer that receives a set of parameters and an output layer that provides a result. In an embodiment, five hidden layers are included within each multilayer perceptron. The five hidden layers include a first hidden layer having ten neurons, a second hidden layer having fifty neurons, a third hidden layer having one-hundred neurons, a fourth hidden layer having fifty neurons, and a fifth hidden layer having ten neurons.

In an embodiment, the optimal signal path is a first optimal signal path. The method includes a step of, after propagating the signal to follow the first optimal signal path, via the network, reanalyzing the plurality of propagation signals transmitted by the base station and received by the destination device to predict a second optimal signal path. Based on a determination that the second optimal signal path differs from the first optimal signal path by having a greater associated signal value, the network selects the second optimal signal path from the plurality of propagation signals. The base station propagates a signal to follow the second optimal signal path from the base station to the destination device, such that the destination device receives the signal from the base station.

An object of the invention is to provide an efficient method for classifying signal strengths and selecting signal paths, particularly for mmWave frequencies and other 5G-NR signals, that comports with 5G-NR reliability requirements.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a mechanism to overcome the problems associated with signal propagation links by using artificial neural networks (ANN). Using a relay link selection protocol, it was found that machine learning can be used to describe and predict an optimal link or path, providing a reliable mechanism to meet 5G-NR's requirements of trustworthy communications under uRLLC and enhanced coverage and improved communications under eMBB. The supervised classification algorithms of the ANN provide categorical class labels when training the dataset of an outdoor urban environment, such that paths are evaluated for predicted propagation links, and such that the strongest propagation link can be selected. Specifically, the multilayer perceptron (MLP) method provides the classifications in the ANN and is used to identify and characterize new link candidates using the path loss parameter or the received signal strength, such that optimal links can be selected. The MLP and ANN methods can also be used to improve massive machine type communications (mMTC). The links that are classified by the system are the incoming signals, and optimum signals are selected based on the classified incoming signal strength. Moreover, based on a data-driven feed-forward neural network-based system using back-propagation and weight adjustment, the MLP reduces false positives and increases true positives relating to a prediction of the optimum signal strength between a transmitter and a receiver, thereby enhancing prediction accuracy. The systems and methods of signal selection will be discussed in greater detail herein below.

Figure 1:
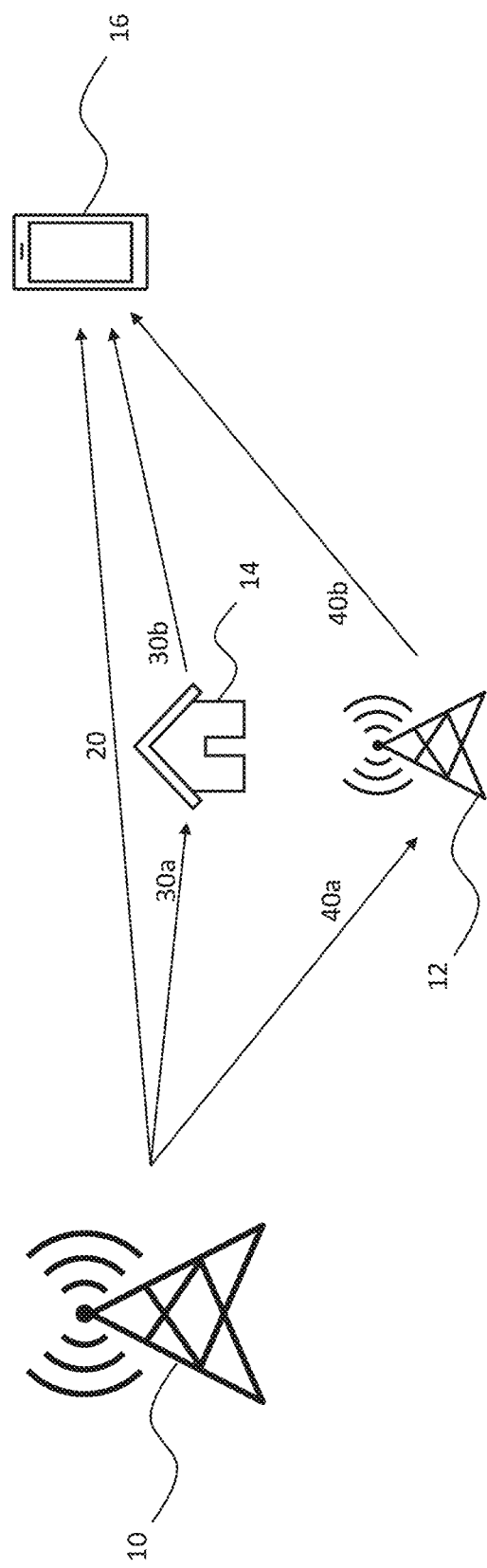
FIG. 1 depicts three paths of signals from a base station to a destination device; an artificial neural network is used herein to select the optimal signal path and handover when the optimal path changes, in accordance with an embodiment of the present invention.

Referring again to FIG. 1, a signal propagation system is shown in greater detail. While signal propagation systems are generally known within the prior art, as noted above, the present invention includes a signal path selection protocol that utilizes ANNs, and particularly, MLPs to determine an optimal signal path in real-time. As such, FIG. 1 depicts an example of three different signal propagation paths that are possible in the practice of the methods described herein. Accordingly, as shown in FIG. 1, base station 10 is in wireless electronic communication with destination device 16, such that signals can be wirelessly transmitted to and received by each of base station 10 and destination device 16. As used herein, a base station is a physical device, such as a cellular-enabled tower, radio mast, array, cell site, or other device that is capable of receiving and transmitting signals across distances to and from electronic devices, such as via antennas. As used herein, a destination device is an electronic device that is configured for wired or wireless communications by transmitting and receiving signals, such as a computing device, mobile telephone, tablet, wearable device, and other similar electronic devices.

In an embodiment, the wireless electronic communication between base station 10 and destination device 16 is accomplished via a direct link between the devices, accomplished via line of sight path 20 between station 10 and device 16. As such, base station 10 and destination device 16 can communicate directly with few or no obstacles obstructing signals propagated by either base station 10 or destination device 16. In some embodiments, line of sight path 20 provides an optimal signal path between base station 10 and destination device 16, providing the strongest signal propagation between station 10 and device 16.

However, as shown in FIG. 1, line of sight path 20 may not be possible in all situations; alternatively, line of sight path 20 may suffer from an obstruction or other reason for incurring a drop in signal strength. Accordingly, alternative signal propagation paths exist between base station 10 and destination device 16. For example, obstruction 14, such as a building, may be disposed between base station 10 and destination device 16, blocking a signal propagated by base station 10 and transmitted in a direction toward destination device 16. In such embodiments, base station 10 propagates a signal via a first portion of obstructed path 30a, such that base station 10 transmits the signal in a direction toward obstruction 14. As the signal reaches obstruction 14, the signal follows a second portion of obstructed path 30b, such that the signal traverses beyond obstruction 14 and is received by destination device 16.

Similarly, in an embodiment, relay station 12 may be disposed between base station 10 and destination device 16. Relay station 12 is in wireless electronic communication with base station 10, such that signals propagated by base station 10 can be received and transmitted by relay station 12. In such embodiments, a signal propagated by base station 10 is receivable by relay station 12 by following a first portion of relay path 40a. After relay station 12 receives the signal, relay station 12 retransmits the signal in a direction toward destination device 16 via a second portion of relay path 40b.

Each of the propagation signals following the paths outlined above must be classified to determine a likelihood of successful signal transfer to destination device 16. The classification technique used in the ANN is binary, including a class of a strong link and a class of a weak link, thereby maintaining a simple classification system. Once propagation results are obtained, the ANN separates the signal losses into classes to consider whether the signal is sufficient or insufficient, according to the binary classification system. To determine the sufficiency of a signal, a threshold energy strength is determined (for example, the methods used herein used a threshold of −120 dBm; any energy strength below the threshold is considered a poor propagation and is classified as an insufficient signal. However, it should be appreciated that alternative threshold values can be used to determine signal sufficiency), as shown in Eq. 1:

$$C_i(x) = \begin{cases} 1, & PL < 120 \text{ dBm} \\ 0, & PL \geq 120 \text{ dBm} \end{cases} \quad (1)$$

where $C_i(x)$ is the link selection class, which depends on the path loss (PL) of the link that can be calculated using models, such as a Floating-Intercept (FI) model of Eqs. 2-3:

$$PL^{FI}(f, d)[dB] = \alpha + 10\beta \log_{10}(d) + X_\sigma^{FL} \quad (2)$$

$$BL = \underset{L_s}{\operatorname{argmin}}(PL_n) \quad (3)$$

where $PL^{FI}(f,d)$ represents path loss in dB based on frequency and distance; $\alpha$ is coefficient representing an optimized offset value for path loss in dB; $\beta$ is a coefficient representing path loss dependence on distance; $X_\sigma^{FL}$ represents a standard deviation for large-scale signal fluctuations over distance; BL is the best link selection; and $PL_n$ is the path loss of the propagated links, while n is the number of transmitted links between the base station and the destination device.

By applying prediction techniques using classification and clustering to estimate the channel path loss, better performance and precision can be attained. For example, MLP is a multilayer classification technique that is a neural network. The data can be classified based on maximum probabilities to predict path loss according to Eq. 4:

$$\hat{C} = \underset{i=1}{\operatorname{argmax}} P(C_i / X) \quad (4)$$

where $\hat{C}$ is the prediction path loss class, and $P(C_i/X)$ is the conditional probability of dataset features given the class. MLP methods will be described in more detail herein below.

MLP uses feed-forward neural networks (FFNNs) and back-propagation networks to compute losses and adjust weights [11], making MLP suitable for deep learning. MLP forms a fully connected network in which every node in a single layer is connected to every node in subsequent layers. The subsequent error is usually obtained by the loss function, and optimization methods can be used to minimize loss (such as adaptive moment estimation, or Adam, optimization algorithms, which are replacement optimization algorithms for stochastic gradient descents for deep learning models). There are multiples of loss functions, and cross entropy is used when relay selection is initially viewed as a binary classification problem. MLP is a multivariate multiple non-linear regression and collection of neurons, serving as a classification by building decisions. MLPs are typically uncorrelated, and a collection of MLPs make up the network, making the network less prone to overfitting. MLP is mathematically expressed in Eqs. 5-7:

$$\mathfrak{R}^n \to \mathfrak{R}'^n : (y_1, y_2, \ldots, y_n) \qquad (5)$$

$$y_n = g_s\left(w_0 + \sum_{j=1}^{n} w_i y_i\right) \qquad (6)$$

$$y_2 = g_{out}\left(w_{k0}^{(2)} + \sum_{j=1}^{M} w_{k0}^{(2)} \gamma\left(w_{j0}^{(1)} + \sum_{j=1}^{n} w_{ji}^{(1)} y_i\right)\right) \qquad (7)$$

where $\mathfrak{R}^n$ represents the real number of independent and dependent $(y_1, y_2, \ldots, y_n)$ data samples. The above structure proceeds with only two layers, in which $y_0=1$ as the output of the first layer. $g_s$ is the activation function and is expressed in Eqs. 8-9:

$$g(\cdot) : R \to R \qquad (8)$$

$$g_s(x) = \begin{cases} 0, & x < 0 \\ 1, & x \geq 0 \end{cases} \qquad (9)$$

To generate the reliability required under 5G-NR, Adam optimization is used to update the weight iterative base in the training data [13] with a learning rate or step size a. Artificial intelligence (AI), particularly machine learning (ML), enables a system to learn, predict, and assess data without the need for human involvement. [14]. A main problem in current communications standards is that of handover; however, ML can enhance prediction accuracies and reduce complexity. Attempts have been made to utilize different ML mechanisms to improve signal strength and communications networks; however, such attempts failed to produce accurate results due in part to the non-use of MLPs. [15-19, 10].

The current method improves over prior art attempts by using MLPs instead. MLPs are typically used for both classification and regressions, with the classifications being binary or multiple, and the regressions being used for continuous outputs. However, the current method classifies link strengths in binary classes to predict the optimal link propagation, and does not require the use of MLPs for regressions. MLP follows Eq. 10:

$$y = \phi\left(\sum_{i=1}^{n} w_i X_i + b\right) \qquad (10)$$

where w is the vector of weights of X vector inputs, b is the error, and $\phi$ is the nonlinear activation function.

Figure 2:
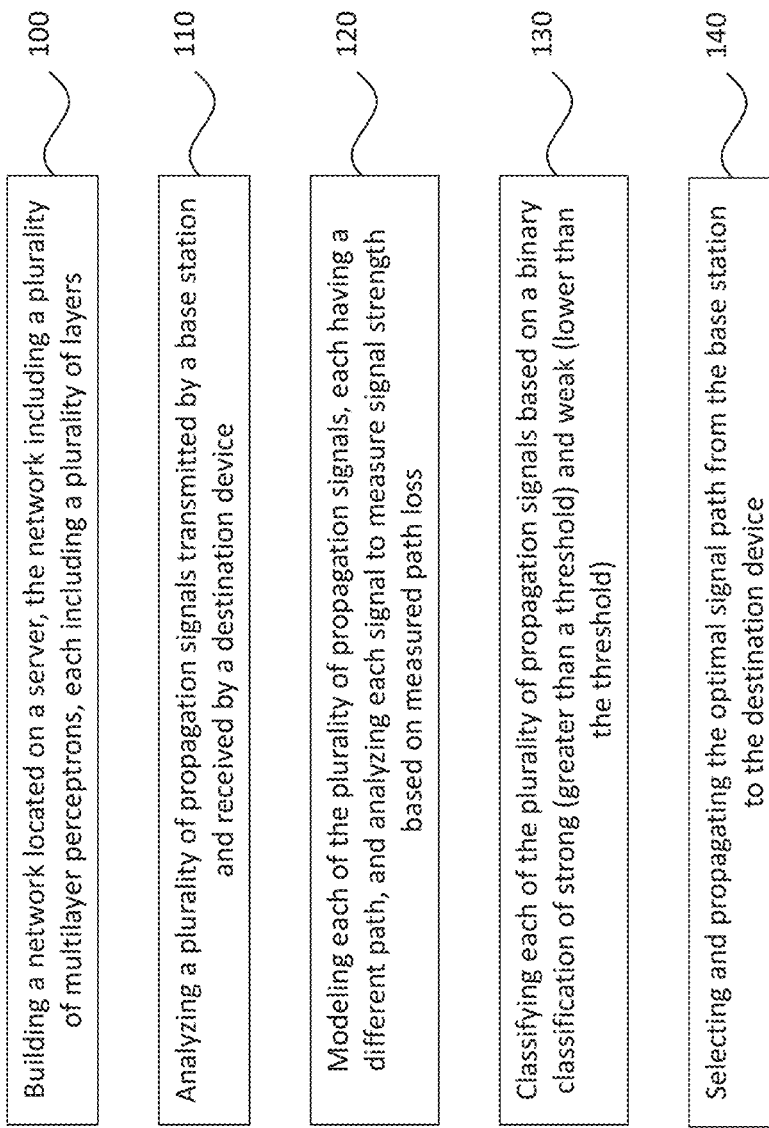
FIG. 2 is a process flow diagram depicting a method of selecting an optimal signal path from a plurality of possible signal paths, in accordance with an embodiment of the present invention.
Figure 4:
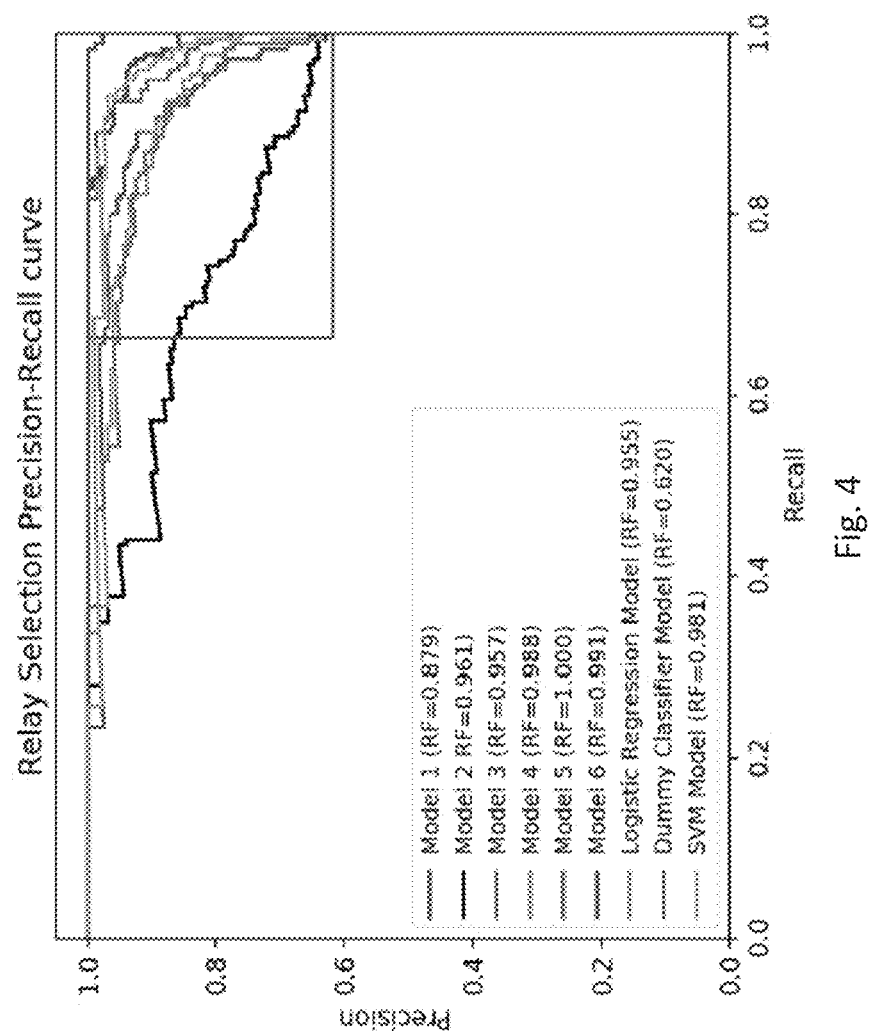
FIG. 4 is a graphical representation of a relay selection precision-recall curve used to compare the classification techniques of different models, in accordance with an embodiment of the present invention.

Referring now to FIG. 2, in conjunction with FIG. 1, an exemplary process-flow diagram is provided, depicting a method of selecting an optimal signal path from a plurality of possible signal paths. The steps delineated in the exemplary process-flow diagram of FIG. 4 are merely exemplary of an order of selecting an optimal signal path. The steps may be carried out in another order, with or without additional steps included therein.

As described above, multiple signal paths are possible as a signal propagated by base station 10 travels in a direction toward destination device 16, which is disposed to receive the signal. Accordingly, as shown in FIG. 2, the method of selecting an optimal signal path begins with step 100, which includes building a network located on a server, such that the network includes a plurality of MLPs, each MLP including a plurality of layers that in turn include a plurality of interconnected nodes, as described in detail above. During step 110, the network analyzes a plurality of propagation signals transmitted by base station 10 and received by destination device 16 to predict an optimal signal path.

During step 120, the network analysis includes a step of modeling each of the plurality of propagation signals, with each of the plurality of propagation signals having a different associated signal path, and analyzing each signal to measure signal strength based on measured path loss. For example, in an embodiment, the network measure a sufficiency of each propagation signal based on a threshold energy strength by measuring a path loss for each of the plurality of propagation signals. The path loss is based on a frequency of each of the plurality of propagation signals and a distance traveled by each of the plurality of propagation signals.

During step 130, the network classifies each of the plurality of propagation signals based on a binary classification of a strong signal value and a weak signal value. The strong signal value includes an associated value greater than the threshold energy strength. Similarly, the weak signal value includes an associated value less than the threshold energy strength. During step 140, the network selects the optimal signal path from the plurality of propagation signals, such that the optimal signal path is associated with the strong signal value. Also during step 140, base station 10 propagates a signal to follow the optimal signal path from base station 10 to destination device 16, such that destination device 16 receives the signal from base station 10. Embodiments of the method described herein, including comparative results with prior art classification attempts, are described in greater detail in the section below.

Experimental Results

Six models of MLPs with different specifications are analyzed and compared with traditional ML methods: Model 1 (one hidden layer of 10 neurons); Model 2 (two hidden layers of 50 and 10 neurons); Model 3 (three hidden layers of 10, 50, and 10 neurons); Model 4 (four hidden layers of 10, 50, 50, and 10 neurons); Model 5 (five hidden layers of 10, 50, 100, 50, and 10 neurons); Model 6 (eight hidden layers of 10, 50, 100, 100, 50, and 10 neurons); Model 7 (logistic regression model); Model 8 (dummy classifier model); and Model 9 (support vector machine). MLPs are employed to predict the optimal propagated link in the relay selection. Then, MLPs are compared with other ML techniques based on precision, recall, F1 score, accuracy, and support parameters. Results are explored using simulated data showing the accuracy of applying deep learning techniques. It is shown that MLP excels at both the prediction of link performance and the classification to select an appropriate link, providing a method of predicting links with low path loss, providing for a reliable handover to meet the 5G-NR end needs of eMBB and uRLLC. While other ANN methods exist, such as convolutional neural networks for images where 2D and 3D inputs exist, MLP excels at signal propagation prediction and selection.

The dataset for the experiment was generated after modification using open source Matlab simulations by New York University. [20, 21]. The dataset of the wireless channels includes two fragments. The selected model is trained and validated on the dataset and is tested using the unseen data. In the experiment, the training portion of the dataset was 75% of the set, and the testing portion of the dataset was 25% of the set. The classes of the classification are binary, with each signal being classified with a 1 (sufficient) or a 0 (insufficient). The measurements are specified based on distance from 1 m to 40 m, thereby being suitable for frequencies from 500 MHz to 100 GHz and bandwidths up to 800 MHz. The dataset used consists of channel properties of a communications link, such that the information helps the base station execute supervised classification based on datasets from prior measurements or simulations. The parameters are shown in Table 1 below:

TABLE 1

Channel Measurement Parameters

| Parameter | Value |
|---|---|
| Distance (m) | 1-40 |
| Frequency (GHz) | 28 |
| Bandwidth (MHz) | 800 |
| TXPower (dBm) | 30 |
| Scenario | UMi |
| Polarization | Co-Pol |
| TxArrayType (transmission array) | ULA (uniform linear array) |
| RxArrayType (receiving array) | ULA |
| Antenna | SISO (single-input single-output) |
| Tx/Rx antenna Azimuth and Elevation (red) | 10° |

To accomplish a broad exploration, MLP, logical regression, dummy classifier, and support vector machine analyses are used to perform classifications and are evaluated by confusion matrix, which quantifies the outcomes of prediction models compared to the training dataset. [23]. The precision parameter typically indicates how often a model makes a positive prediction and the recall shows the confidence level of a model of predicting all positive targets. As noted above, accuracy, precision, recall, and F1 score metrics were used to evaluate the ML classifiers. The accuracy parameter is a measurement of the number of true predictions to the total number of predictions, or the number of correctly predicted selected links divided by the total number of links, indicating if the classifier is able to avoid misclassifying a positive path loss. The precision parameter represents the number of true positives (Tp) divided by the number of true and false positives (Fp). The recall parameter represents the number of true positives divided by the number of true positives and false negatives (FN). Finally, the F1 score measures the harmonic mean for both precision and recall. These values are expressed in Eqs. 11-13:

$$\text{Average Precision} = \frac{1}{n}\sum_{i=1}^{n}\frac{Tp}{Tp+Fp} \quad (11)$$

$$\text{Total Recall} = \sum_{i=1}^{n}\frac{Tp}{Tp+FN} \quad (12)$$

$$F1\text{ Score} = 2 \times \frac{\text{precision} \times \text{recall}}{\text{precision} + \text{recall}} \quad (13)$$

Results from testing each of the nine models described above are shown in Tables 2-3 below:

TABLE 2

Interpretation of Performance Measures

| ANN Model | Precision | Recall | F1 Score |
|---|---|---|---|
| Model 1 | 0.39 | 0.61 | 0.47 |
| Model 2 | 0.88 | 0.87 | 0.87 |
| Model 3 | 0.86 | 0.86 | 0.86 |

TABLE 2-continued

Interpretation of Performance Measures

| ANN Model | Precision | Recall | F1 Score |
|---|---|---|---|
| Model 4 | 0.93 | 0.91 | 0.92 |
| Model 5 | 0.98 | 0.98 | 0.98 |
| Model 6 | 0.88 | 0.87 | 0.88 |
| Logistic Regression | 0.86 | 0.86 | 0.86 |
| Dummy Classifier | 0.56 | 0.57 | 0.57 |
| SVM | 0.92 | 0.93 | 0.93 |

TABLE 3

Accuracy Compression of Models

| ANN Model | Accuracy | ROC AUC Score |
|---|---|---|
| Model 1 | 0.623 | 0.484 |
| Model 2 | 0.868 | 0.877 |
| Model 3 | 0.857 | 0.842 |
| Model 4 | 0.925 | 0.932 |
| Model 5 | 0.982 | 0.981 |
| Model 6 | 0.882 | 0.866 |
| Logistic Regression | 0.882 | 0.866 |
| Dummy Classifier | 0.857 | 0.848 |
| SVM | 0.934 | 0.973 |

Figure 3:
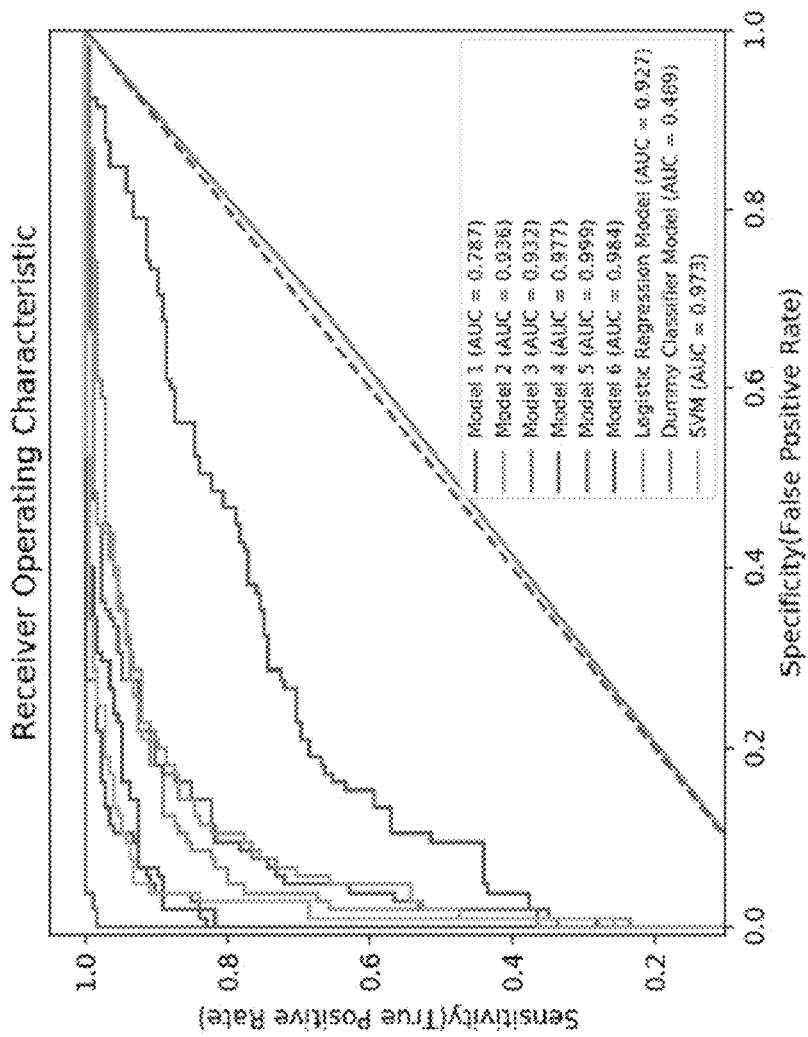
FIG. 3 is a graphical representation of a receiver operating characteristic analysis used to compare the classification techniques of different models, in accordance with an embodiment of the present invention.

As shown in Tables 2-3 above, Model 5 (five hidden layers of 10, 50, 100, 50, and 10 neurons) performed best among the tested models, followed by Model 4; Model 1 and the dummy classifier model performed the worst among the tested models. A possible explanation for the performance is that some of the features depend on each other, such as distance and received power. Model 6, despite having a greater number of neurons than Model 5, began degrading once the number of hidden layers reached 70% of the number of inputs, as shown in FIG. 3 (showing the receiver operating characteristic (ROC) curves of the classification techniques). Each ROC curve visually represents a classifier's performance by plotting the false positive rate against the true positive rate, and the collection of ROC curves in FIG. 3 shows that Model 5 is the optimal model, with a reliability result of approximately 99%. In addition, FIG. 4 illustrates the relay selection precision-recall curve (the relationship between the true positive rate and the positive prediction value) for each model, again showing that Model 5 performed the best among the tested models.

Figure 5:
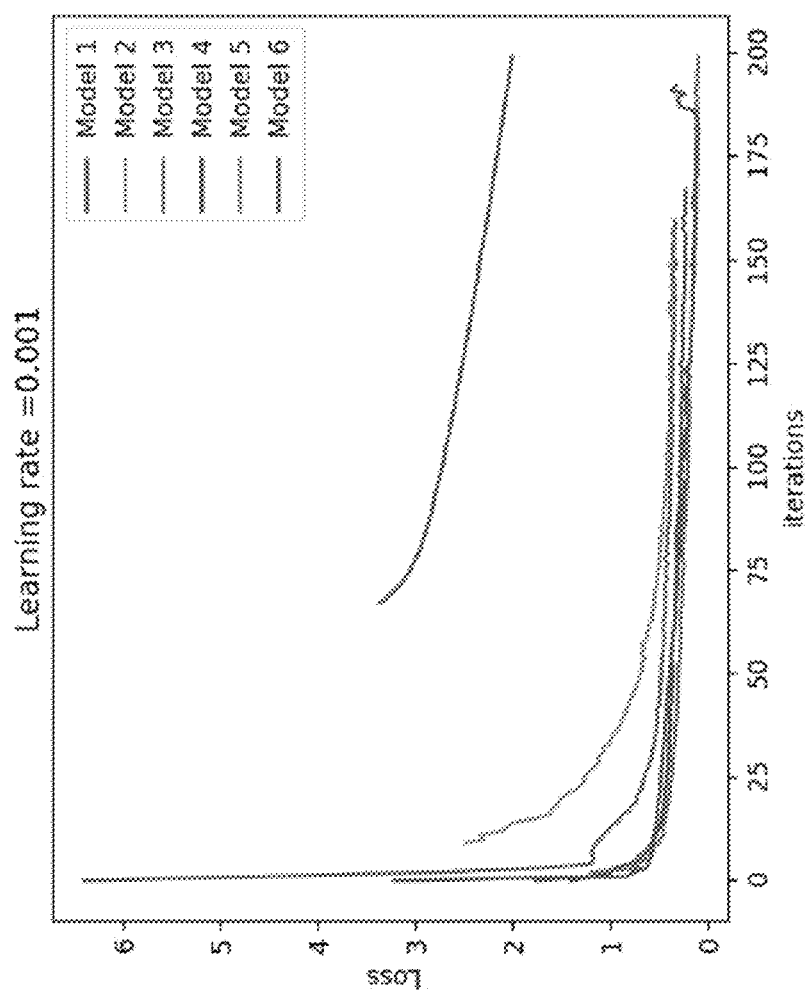
FIG. 5 graphically depicts the relationship between loss and iterations of different models, in accordance with an embodiment of the present invention.

Finally, FIG. 5 shows the loss versus neural iterations curves for the models, depicting the point at which the training data will not improve the performance of the model by at least a tolerance value (such as $1e^{-4}$) or by having a constant loss for multiple iterations. As shown in FIG. 4, the losses of models decreased smoothly, except Model 1 (due to the adjusted learning rate of Model 1 of $1e^{-5}$, while the other models have an adjusted learning rate of 0.05). Analyzing Model 6 in particular, at iteration number 185, the curve begins to increase, indicating that the model should be stopped to avoid issues with overfitting and decreasing the efficiency of the model. Again, FIG. 5 shows that Model 5 is the optimal ANN model.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

References

[1] Liu, K. J. R. et al. *Cooperative communications and networking*. Cambridge: Cambridge University Press. 2009.

[2] Qiao, J. et al. *Enabling multi-hop concurrent transmission in 60 GHz*. Wireless Personal Area Networks, 10(11), 3824-3833. 2011.

[3] Wu, S. et al. *Improving the coverage and spectral efficiency of millimeter-wave cellular networks using device-to-device relays*. IEEE Transactions on Communications, 66(0, 2251-2265. 2018.

[4] Attiah, M. L. et al. *Adaptive multi-state millimeter wave cell selection scheme for 5G communications*. International Journal of Electrical and Computer Engineering (IJECE), 8(5), 2967-2978. 2018.

[5] Amjad, M. et al. *Effective capacity in wireless networks: A comprehensive survey*. rXiv preprint arXiv: 1811.03681. 2019.

[6] Mao, Q. et al. *Deep learning for intelligent wireless networks: A comprehensive survey*. IEEE Communications Surveys and Tutorials, 20(4), 2595-2621. 2018.

[7] Hackeling, G. *Mastering machine learning with scikit-learn*. 14. 2014.

[8] Wang, C. et al. *A survey of 5G channel measurements and models*. IEEE Communications Surveys and Tutorials, 20(4), 3142-3168. 208.

[9] Piacentini, M. and Rinaldi, F. *Path loss prediction in urban environment using learning machines and dimensionality reduction techniques*. Springer Computational Management Science, 8(4), 371-385. 2011.

[10] Aldossari, S. M. and Chen, K-C. *Machine learning for wireless communication channel modeling: An overview*. Wireless Personal Communications, 106(1), 41-70. 2019.

[11] Haykin, S. *Neural Networks and Learning Machines*. Prentice-Hall. 2008.

[12] Kingma, D. and Ba, J. *Adam: A method for stochastic optimization*. asXiv reprint arXiv:1412.6980. 2014.

[13] Jiang, C. et al. *Machine learning paradigms for next-generation wireless networks*. IEEE Wireless Communications, 24(2), 98-105. 2017.

[14] Shah, V. K. and Gharge, A. P. *A review on relay selection techniques in cooperative communication*. International Journal of Engineering and Innovative Technology, 2(5), 65-69. 2012.

[15] Ben-Hur, A. et al. *Support vector clustering*. Journal of Machine Learning Research, 2, 125-137. 2001.

[16] Hengtao, H. et al. *Deep learning-based channel estimation for beamspace mmWave massive MIMO system*. arXiv, 2-5. 2018.

[17] Jiang, Z. et al. *Inferring remote channel state information: Cramér-Rao lower bound and deep learning implementation*. IEEE Globecom. 2018.

[18] O'Shea, T. J. et al. *Deep learning based MIMO communications*. arXiv preprint arXiv:1707.07980. 2017.

[19] Mohri, M. et al. *Foundations of machine learning*. The MIT Press. 2012.

[20] Sun, S. et al. *A novel millimeter-wave channel simulator and applications for 5G wireless communications*. 2017 IEEE International Conference on Communications (ICC). 2017.

[21] NYUSIM, N. Y. U. *5G millimeter wave (mmW) simulator.* 2016-2018; available from http://wireless.engineering.nyu.edu/5g-millimeter-wave-channel-modeling-software/.

[22] Ebhota, V. C. et al. *Improved adaptive signal power loss prediction using combined vector statistics based smoothing and neural network approach*. Progress in Electromagnetics Research C, 82, 155-169. 2018.

[23] Kelleher, J. D. et al. *Fundamentals of machine learning for predictive data analytics: Algorithms, worked examples, and case studies*. The MIT Press, Cambridge, Massachusetts. 2015.

[24] Powers, D. M. W. *Evaluation: From precision, recall and F-measure to ROC, informedness, markedness, and correlation*. Journal of Machine Learning Technologies, 2(1) 37-63. 2011.

[25] Sankhe, K. et al. *Machine learning based cooperative relay selection in virtual MIMO*. 6. 2015.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of selecting an optimal signal path between a base station and a destination device, the method comprising the steps of:
    building a network located on a server, the network including a plurality of multilayer perceptrons, each multilayer perceptron including a plurality of layers, each of the plurality of layers including a plurality of nodes, with each of the plurality of nodes in a single layer being connected to each of the plurality of nodes in a remainder of the plurality of layers;
    via the network, analyzing a plurality of propagation signals transmitted by a base station and received by a destination device to predict an optimal signal path by:
        modeling, via the network, each of the plurality of propagation signals, each of the plurality of propagation signals having a different associated signal path;
        analyzing, via the network, each of the plurality of propagation signals to measure a sufficiency of each propagation signal based on a threshold energy strength by:
            measuring a path loss for each of the plurality of propagation signals, the path loss based on a frequency of each of the plurality of propagation signals and a distance traveled by each of the plurality of propagation signals; and
            classifying, via the network, each of the plurality of propagation signals based on a binary classification of a strong signal value and a weak signal value, such that the strong signal value includes an associated value greater than the threshold energy strength, and such that the weak signal value includes an associated value less than the threshold energy strength;
    selecting, via the network, the optimal signal path from the plurality of propagation signals, such that the optimal signal path is associated with the strong signal value; and
    propagating, via the base station, a signal to follow the optimal signal path from the base station to the destination device, such that the destination device receives the signal from the base station.

2. The method of claim 1, wherein the server is located proximate to the base station.

3. The method of claim 1, wherein, for each of the plurality of multilayer perceptrons, the plurality of layers includes a plurality of hidden layers between an input layer that receives a set of parameters and an output layer that provides a result.

4. The method of claim 3, wherein the plurality of hidden layers includes five hidden layers.

5. The method of claim 4, wherein the five hidden layers include a first hidden layer having ten neurons, a second hidden layer having fifty neurons, a third hidden layer having one-hundred neurons, a fourth hidden layer having fifty neurons, and a fifth hidden layer having ten neurons.

6. The method of claim 1, wherein the optimal signal path is a first optimal signal path, further comprising the step of, after propagating the signal to follow the first optimal signal path, via the network, reanalyzing the plurality of propagation signals transmitted by the base station and received by the destination device to predict a second optimal signal path.

7. The method of claim 6, further comprising the step of, based on a determination that the second optimal signal path differs from the first optimal signal path by having a greater associated signal value, selecting, via the network, the second optimal signal path from the plurality of propagation signals.

8. The method of claim 7, further comprising the step of propagating, via the base station, a signal to follow the second optimal signal path from the base station to the destination device, such that the destination device receives the signal from the base station.

9. The method of claim 1, wherein each of the plurality of propagation signals transmitted by the base station resides within frequency ranges associated with 5G new radio standards.

10. A system for selecting an optimal signal path between a base station and a destination device, the system comprising:
    a base station spaced apart from a destination device, the base station including a computing node housing a server thereon, the server including a network having a plurality of multilayer perceptrons, each multilayer perceptron including a plurality of layers, each of the plurality of layers including a plurality of nodes, with each of the plurality of nodes in a single layer being connected to each of the plurality of nodes in a remainder of the plurality of layers; and
    a plurality of propagation signals transmitted by the base station and received by the destination device,
    wherein the network is configured to analyze the plurality of propagation signals to predict an optimal signal path by:
        modeling each of the plurality of propagation signals, each of the plurality of propagation signals having a different associated signal path;
        analyzing each of the plurality of propagation signals to measure a sufficiency of each propagation signal based on a threshold energy strength by:
            measuring a path loss for each of the plurality of propagation signals, the path loss based on a frequency of each of the plurality of propagation signals and a distance traveled by each of the plurality of propagation signals; and
        classifying each of the plurality of propagation signals based on a binary classification of a strong signal value and a weak signal value, such that the strong signal value includes an associated value greater than the threshold energy strength, and such that the weak signal value includes an associated value less than the threshold energy strength; and
        selecting the optimal signal path from the plurality of propagation signals, such that the optimal signal path is associated with the strong signal value, and
    wherein the base station propagates a signal to follow the optimal signal path from the base station to the destination device, such that the destination device receives the signal from the base station.

11. The system of claim 10, wherein, for each of the plurality of multilayer perceptrons, the plurality of layers includes a plurality of hidden layers between an input layer that receives a set of parameters and an output layer that provides a result.

12. The system of claim 11, wherein the plurality of hidden layers includes five hidden layers.

13. The system of claim 12, wherein the five hidden layers include a first hidden layer having ten neurons, a second hidden layer having fifty neurons, a third hidden layer having one-hundred neurons, a fourth hidden layer having fifty neurons, and a fifth hidden layer having ten neurons.

14. The system of claim 10, wherein the optimal signal path is a first optimal signal path, wherein the network is configured to reanalyze the plurality of propagation signals transmitted by the base station and received by the destination device to predict a second optimal signal path.

15. The system of claim 14, wherein the network is configured to select the second optimal signal path from the plurality of propagation signals based on a determination that the second optimal signal path differs from the first optimal signal path by having a greater associated signal value.

16. The system of claim 15, wherein the base station propagates a signal to follow the second optimal signal path from the base station to the destination device, such that the destination device receives the signal from the base station.

17. The system of claim 10, wherein each of the plurality of propagation signals transmitted by the base station resides within frequency ranges associated with 5G new radio standards.

18. A method of selecting an optimal signal path between a base station and a destination device for a propagation of 5G new radio signals, the method comprising the steps of:
 disposing a server proximate to a base station, the server including a network having a plurality of multilayer perceptrons, each multilayer perceptron including an input layer, an output layer, and a plurality of hidden layers disposed between the input layer and the output layer, each of the plurality of hidden layers including a plurality of nodes, with each of the plurality of nodes in a single hidden layer being connected to each of the plurality of nodes in a remainder of the plurality of hidden layers;
 via the plurality of multilayer perceptrons, analyzing a plurality of propagation signals transmitted by a base station and received by a destination device to predict an optimal signal path by:
  modeling, via the plurality of multilayer perceptrons, each of the plurality of propagation signals, each of the plurality of propagation signals having a different associated signal path;
  analyzing, via the plurality of multilayer perceptrons, each of the plurality of propagation signals to measure a sufficiency of each propagation signal based on a threshold energy strength by:
   measuring a path loss for each of the plurality of propagation signals, the path loss based on a frequency of each of the plurality of propagation signals and a distance traveled by each of the plurality of propagation signals;
  classifying, via the plurality of multilayer perceptrons, each of the plurality of propagation signals based on a binary classification of a strong signal value and a weak signal value, such that the strong signal value includes an associated value greater than the threshold energy strength, and such that the weak signal value includes an associated value less than the threshold energy strength;
 selecting, via the network, the optimal signal path from the plurality of propagation signals, such that the optimal signal path is associated with the strong signal value; and
 propagating, via the base station, a signal to follow the optimal signal path from the base station to the destination device, such that the destination device receives the signal from the base station.

19. The method of claim 18, wherein the optimal signal path is a first optimal signal path, further comprising the step of, after propagating the signal to follow the first optimal signal path, via the plurality of multilayer perceptrons, reanalyzing the plurality of propagation signals transmitted by the base station and received by the destination device to predict a second optimal signal path.

20. The method of claim 19, further comprising the steps of:
 based on a determination that the second optimal signal path differs from the first optimal signal path by having a greater associated signal value, selecting, via the network, the second optimal signal path from the plurality of propagation signals; and
 propagating, via the base station, a signal to follow the second optimal signal path from the base station to the destination device, such that the destination device receives the signal from the base station.

* * * * *